United States Patent [19]

Shah et al.

[11] 4,306,039
[45] Dec. 15, 1981

[54] THERMOPLASTIC ELASTOMERIC COMPOSITIONS

[75] Inventors: Kishore R. Shah, Chelmsford; Samuel C. Temin, Needham, both of Mass.

[73] Assignee: The Kendall Company, Boston, Mass.

[21] Appl. No.: 142,986

[22] Filed: Apr. 23, 1980

Related U.S. Application Data

[63] Continuation-in-part of Ser. No. 963,898, Nov. 27, 1978, abandoned.

[51] Int. Cl.³ .............................................. C08L 39/06
[52] U.S. Cl. ................................................... 525/205
[58] Field of Search ......................................... 525/205

[56] References Cited

U.S. PATENT DOCUMENTS 3,027,347 8/1962 Fikentscher et al. ............... 525/205
3,928,262 12/1975 Ono et al. ........................... 525/205

Primary Examiner—J. Ziegler

[57] ABSTRACT

A non-tacky thermoplastic elastomeric composition which is an optically clear blend of (A) a copolymer of ethyl or butyl acrylate or mixtures thereof with from 2 to 10% by weight of a copolymerizable ethylenic monomer containing an acid group and (B) from 2 to 15%, by weight of the blend, of a water-soluble homopolymer of a vinyl lactam having the structure

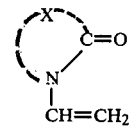

in which X represents an alkylene bridge having three to five carbon atoms, or from 2 to 30%, by weight of the blend, of a copolymer of said lactam with from 1 to 80 mole percent of a copolymerizable monomer containing a polymerizable ethylenic unsaturation, the vinyl lactam polymer or copolymer having a glass transistion temperature from 20° to 250° C.

12 Claims, No Drawings

THERMOPLASTIC ELASTOMERIC COMPOSITIONS

This application is a continuation-in-part of our copending application Ser. No. 963,898, filed Nov. 27, 1978, now abandoned.

This invention relates to a thermoplastic elastomeric composition comprising a blend of (A) a high molecular weight copolymer of ethyl or butyl acrylate or mixtures thereof with an ethylenic monomer containing an acid group and (B) a water-soluble homopolymer of vinyl lactam or a copolymer of a vinyl lactam with 1 to 80 mole percent of copolymerizable monomer containing a polymerizable ethylenic unsaturation, the vinyl lactam polymer or copolymer having a glass transition temperature from 20° to 250° C.

It has previously been proposed to provide thermoplastic elastomeric compositions in the form of oil extended hydrogenated block copolymers of styrene and conjugated dienes as described, for example, in Haefele et al. U.S. Pat. No. 3,485,787. Such compositions are unlike ordinary elastomers in that they possess the necessary strength without vulcanization or cross-linking and, therefore, they permanently retain their thermoplasticity. Acrylic elastomers have been made by chemically cross-linking polymers of acrylic esters such as polymers of ethyl or butyl acrylate, which polymers without cross-linking have inadequate tensile strength for most purposes, but such cross-linking destroys or greatly decreases the original thermoplasticity of the polymers. It has also been proposed to react water-soluble poly(N-vinyl lactams) with polymeric carboxylic acids (including copolymers) to form water-insoluble compositions useful for a variety of purposes as described in Stoner et al. U.S. Pat. No. 2,901,457; and in Ono et al. U.S. Pat. No. 3,975,570, in which it was proposed to improve the moisture permeability of conventional pressure-sensitive adhesives which are copolymers of alkyl acrylates with acrylic or methacrylic acid by blending with them hydroxyethyl cellulose, it was stated that blends of such adhesives with poly(vinyl pyrrolidone) did not exhibit improved moisture permeability. It has also been proposed to react water-soluble poly(N-vinyl lactams) with polymeric carboxylic acids (including copolymers) to form water-insoluble compositions useful for a variety of purposes, as described in Stoner et al. U.S. Pat. No. 2,901,457. As pointed out by Stoner et al. at column 4, lines 56-73, the reaction product there described always has substantially the same properties and contains the two polymeric components in the same proportions regardless of the proportions of the two used to make the product. The compositions of the present invention, on the other hand, vary in properties and in proportions of components depending upon proportions of starting materials. Moreover, it has been reported in Boyer-Kawenoki, Compt. Rend., Ser. C, Vol. 263, p. 278 (Chem. Abs. Vol. 65, 20283d) 1966 that an I.R. spectrum of the addition product of poly(vinyl pyrrolidone) and poly(acrylic acid) indicated hydrogen bonding between the pyrrolidone carbonyl groups and the carboxyl groups of the poly(acrylic acid). In Ono et al. U.S. Pat. No. 3,975,570, it has been proposed to improve the moisture permeability of conventional pressure-sensitive adhesives which are copolymers of alkyl acrylates with acrylic or methacrylic acid by blending with them hydroxyethyl cellulose, and it was stated that blends of such adhesives with poly(vinyl pyrrolidone) did not exhibit improved moisture permeability.

There are described and claimed in the copending application of Shah, Ser. No. 956,061, filed Oct. 30, 1978 now abandoned, and Ser. No. 137,297 filed Apr. 4, 1980, a pressure-sensitive adhesive composition which is a blend of a poly(N-vinyl lactam) with certain acrylic ester copolymers of relatively low molecular weight. There are also described and claimed in the copending application of Shah, Ser. No. 957,885, filed Nov. 6, 1978 now abandoned, and Ser. No. 100,375 filed Dec. 5, 1979, a highly water-sorptive composition which is a blend of large proportion of a poly(N-vinyl lactam) with certain copolymers.

It has now been found that high molecular weight copolymers of ethyl or butyl acrylate or mixtures thereof with acidic ethylenic monomers in which the acidic group is sulfonic, phosphonic or carboxylic, which copolymers are thermoplastic, can be converted into non-tacky, non-adhesive, strong and tough elastomeric compositions without loss of thermoplasticity by by blending with the copolymers a poly(N-vinyl lactam), the total blend containing from 2 to 15% of poly(N-vinyl lactam) by weight or by blending with the copolymers a copolymer of N-vinyl lactam with a copolymerizable monomer containing a polymerizable ethylenic unsaturation, the total blend containing from 2 to 30% by weight of the N-vinyl lactam copolymer, the vinyl lactam polymer or copolymer having a glass transition temperature from 20° to 250° C., preferably from 20° to 200° C.

The ethyl or butyl acrylate copolymers employed in the present invention have high molecular weights, from about 600,000 to 1,000,000 or more, have glass transition temperatures from about $-10°$ to about $-50°$ C., and are copolymers of ethyl or butyl acrylate or mixtures thereof with ethylenic monomers containing an acid group which is carboxylic, sulfonic or phosphonic, such as acrylic or methacrylic acid, crotonic acid, maleic acid, 2-sulfoethylmethacrylate, and 1-phenylvinylphosphonic acid. Preferably, the acid group in the ethylenic monomer is carboxylic, acrylic acid being the acidic monomer of choice. The amount of copolymerizable ethylenic acid-containing monomer in the copolymer may vary from 2 to 10% by weight of the copolymer, the balance being ethyl or butyl acrylate. These copolymers can be prepared by conventional polymerization processes in emulsion, in solution, or in bulk; they may range from about 600,000 to 1,000,000 or more in molecular weight, preferably from 750,000 to 1,000,000 or more.

The N-vinyl lactams, homopolymers and copolymers of which can be used in the present invention include those having the structure

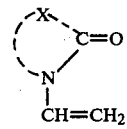

in which X represents an alkylene bridge having 3 to 5 carbon atoms, such as 1-vinyl-2-pyrrolidone, 1-vinyl-5-methyl-2-pyrrolidone, 1-vinyl-2-piperidone, and N-vinyl-epsilon-caprolactam; the polymers may have molecular weights from 10,000 to 1,000,000 or more. Polymers and copolymers of 1-vinyl-2-pyrrolidone, i.e., those in which X represents —CH$_2$CH$_2$CH$_2$— are preferred. The amount of homopolymeric N-vinyl lactam in the blend can vary from 2 to 15% by weight of the total blend. Preferably the weight percent of homopolymer of N-vinyl lactam based on the total weight of polymer and ethyl or butyl acrylate copolymer should total from 5 to 15. The N-vinyl lactam copolymers may contain 1 to 80 mole percent, preferably 1 to 75 mole percent of copolymerizable monomer or mixture of monomers such as vinyl acetate and alkyl acrylates or methacrylates in which the alkyl group contains from 1 to 14 carbon atoms, the balance of the copolymer being N-vinyl lactam, preferably 1-vinyl-2-pyrrolidone. These polymers and copolymers may have molecular weights from 10,000 to 1,000,000 or more, and they have a glass transition temperature from 20° to 250° C., preferably 20° to 200° C. The copolymers may or may not be water-soluble. The amount of N-vinyl lactam copolymer in the blend can vary from 2 to 30% by weight of the blend, depending upon the precise polymer or copolymers present and the precise properties desired in the blend. These polymers and copolymers can be prepared by conventional procedures.

The blended compositions can be made by mixing together solutions of the copolymers and of the N-vinyl lactam polymers or copolymers in any desired vehicles or solvents which are miscible with each other, then removing the vehicle or solvent, as by evaporation. It is also possible to blend them on conventional mixing equipment such as a two-roll mill or in an extruder.

Although different polymers and copolymers are normally considered to be incompatible with one another when mixed, and incapable of forming a homogeneous blend having properties different from either of the components, the blends of the present invention are optically clear and transparent in the absence of any fillers or similar additives, indicating that the blends are homogeneous at least to the extent that no discrete particles of either component greater than 4,000 Å in diameter are present.

Because of the thermoplasticity of the blended compositions of the present invention, they can be repeatedly formed or shaped simply by heating to elevated temperatures, e.g., 170°–200° C. and subjecting them to pressure, as for example in a mold or in an extruder nozzle. When cooled to room temperature, the shaped articles made from the blended composition are transparent, extremely tough, and elastic in nature. They can be stretched to at least 400% of their original length, from which they rapidly regain their original length when tension is released.

The blended compositions exhibit considerably enhanced tensile strength and modulus of elasticity, and somewhat decreased elongation as contrasted to the non-blended acrylate copolymers. The magnitude of these properties of the blended compositions depends upon the amount of acidic comonomer, molecular weight of the copolymer, the relative proportion of N-vinyl lactam polymer or copolymer present in the blend, and the molecular weight of the N-vinyl lactam polymer or copolymer. In general, an increase in the magnitude of the above variables results in increase of tensile strength of the blended composition.

In order to achieve desirable properties and service life of the blended compositions, it may be desirable to include in the composition in addition to the N-vinyl lactam polymer or copolymer and the ethyl or butyl acrylate copolymer, conventional stabilizers, pigments, fillers and other compounding agents.

These blended compositions are especially suited for acceptable performance in an environment where there is exposure to sulfur-modified oils at elevated temperatures, under which conditions the unsaturated rubbers of commerce fail. The acrylic elastomers, as a class, are not recommended for use in water, steam, or water soluble materials, such as methanol or ethylene glycol. An important application of these blended compositions is as seals and gaskets for auto engines and other machines.

The following specific examples are intended to illustrate more fully the nature of the present invention without acting as a limitation upon its scope.

EXAMPLES 1–6

Copolymers of ethyl acrylate with three different proportions of acrylic acid were prepared by conventional solution polymerization procedures by dissolving the desired proportions (40% solids) of monomers in ethyl acetate and by employing as the initiator of polymerization a small amount (0.1% by weight of the monomers) of a free radical generator such as benzoyl peroxide or 2-t-butylazo-2-cyano propane. Polymerization was carried out at 80°–90° C. to a high degree of conversion. The peak molecular weight as determined by gel permeation chromatography and stress strain properties as determined by ASTM procedure D-412 were as follows:

| | | Ethyl Acrylate Copolymers | | | |
|---|---|---|---|---|---|
| No. | Wt % Acrylic Acid | $M_p \times 10^3$ | Tensile Strength, PSI at 100% | 300% | Break | Ultimate Elongation, % |
| 1 | 3 | 923 | 38 | 50 | 85 | 1155 |
| 2 | 4 | 1076 | 40 | 71 | 106 | 1285 |
| 3 | 5 | 1076 | — | — | 202 | 670 |

Blends of the copolymers with poly(vinyl pyrrolidone), grade K-90 (M.w. 360,000), were prepared by dissolving appropriate amounts of the respective copolymer and the polymer in chloroform and then heating the resulting solution at 120° C. under reduced pressure to evaporate the solvent and leave a transparent solid polymeric residue. The dry polymeric blends were then formed into sheets 2–3 mm in thickness in a press heated at 170° C. and their stress-strain characteristics determined by the same ASTM procedure as above. The results were as follows:

| Blend of Copolymer with Poly(Vinyl pyrrolidone) | | | | | |
|---|---|---|---|---|---|
| Copolymer No. | Wt % of Poly(vinyl pyrrolidone) | Tensile Strength, PSI at 100% | 300% | Break | Ultimate Elongation, % |
| 1 | 5 | 63 | 100 | 323 | 706 |
| 1 | 10 | 76 | 156 | 508 | 778 |
| 2 | 5 | 67 | 129 | 508 | 1040 |
| 2 | 10 | 90 | 200 | 705 | 738 |
| 3 | 5 | 106 | 229 | 557 | 853 |
| 3 | 10 | 120 | 312 | 996 | 773 |

EXAMPLE 7

A copolymer of 97.5% by weight of butyl acrylate and 2.5% by weight of acrylic acid was prepared by polymerizing the monomers in solution (50% solids) in refluxing ethyl acetate using the same initiator as in the preceding Examples. The resulting copolymer was isolated by heating the solution at 120° C. under vacuum to evaporate volatile materials. A mixture of 8.57 grams of the dry copolymer and 0.95 grams of poly(N-vinyl-2-pyrrolidone) having a molecular weight of 360,000 was dissolved in 50 ml of chloroform and the solution was heated at 120° C. in vacuum to evaporate the solvent, leaving the solid transparent blended polymer composition. The blended composition was formed into a sheet as in the preceding Examples. The formed sheet was transparent, tough and elastic but more compliant than any of the blends of Examples 1–6.

EXAMPLES 8 TO 13

A copolymer of 95% ethyl acrylate and 5% acrylic acid by weight was prepared essentially as described in Example 1 above. In addition, a series of 1-vinyl-2-pyrrolidone copolymers containing varying proportions of vinyl acetate, butyl methacrylate and methyl methacrylate was prepared by dissolving the desired proportions of monomers in a suitable solvent such as ethyl acetate, or a mixture of dioxane and ethyl alcohol, etc. and by employing as initiator approximately 0.1% by weight of a free radical generator such as benzoyl peroxide or azo bis-isobutyronitrile. Polymerization was carried out at 85°–95° C. to a degree of conversion of about 90%, and the copolymer was precipitated in purified form by pouring a dilute solution (ca. 10% by weight) drop by drop into an excess of methanol. These copolymers had the following compositions:

| Example No. | Comonomer | Mol. Ratio of Comonomer: 1-vinyl-2-pyrrolidone |
|---|---|---|
| (8) | Butyl Methacrylate | 75:25 |
| (9) | Butyl Methacrylate | 75:25 |
| (10) | Butyl Methacrylate | 75:25 |
| (11) | Vinyl Acetate | 75:25 |
| (12) | Vinyl Acetate | 50:50 |
| (13) | Methyl Methacrylate | 75:25 |

Blends of the foregoing in varying proportions by weight were then prepared as shown in Table I. In some cases, the ethyl acrylate copolymer, still in solution in the solvent in which it was polymerized, was mixed with a solution of the vinyl pyrrolidone copolymer in a compatible solvent such as chloroform and the two solvents were then removed by volatilization at reduced pressure. In other cases, the solvent was first removed from the solution of ethyl acrylate copolymer by heating at reduced pressure and the solvent-free copolymer was then blended with solvent free vinyl pyrrolidone copolymer by milling on a heated 2-roll mill. The blended composition was then formed into a sheet as in the preceding Examples. The sheets were transparent, tough and elastic, the tensile strength and ultimate elongation being as shown in Table I below:

TABLE I

| Ex No | WT % OF 1-VINYL-2-PYRROLIDONE COPOLYMER IN BLEND | TENSILE STRENGTH PSI @ | | | ULTIMATE ELONGATION (%) |
|---|---|---|---|---|---|
| | | 100% | 300% | Break | |
| 8 | 10 | 79 | 141 | a | >700 |
| 9 | 20 | 144 | 317 | 490 | 570 |
| 10 | 30 | 267 | 577 | 722 | 425 |
| 11 | 20 | 91 | 196 | 466 | 617 |

TABLE I-continued

| Ex No | WT % OF 1-VINYL-2-PYRROLIDONE COPOLYMER IN BLEND | TENSILE STRENGTH PSI @ | | | ULTIMATE ELONGATION (%) |
|---|---|---|---|---|---|
| | | 100% | 300% | Break | |
| 12 | 20 | 345 | 750 | 1059 | 426 |
| 13 | 20 | 169 | 449 | 865 | 485 | a Sample did not break.

What is claimed is:

1. A non-tacky thermoplastic elastomeric composition comprising an optically clear blend of (A) a high molecular weight copolymer of ethyl or butyl acrylate or mixtures thereof with from 2 to 10% by weight, based on the weight of the copolymer, of a copolymerizable ethylenic monomer containing an acid group, said copolymer having a molecular weight of at least 600,000 and a glass transition temperature from −10° C. to −50° C., and (B) from 2 to 15%, by weight of the blend, of a water-soluble homopolymer of a vinyl lactam having the structure

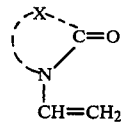

in which X represents an alkylene bridge having three to five carbon atoms, or from 2 to 30%, by weight of the blend, of a copolymer of said vinyl lactam with from 1 to 80 mole percent of a copolymerizable monomer containing a polymerizable ethylenic unsaturation, said vinyl lactam polymer and copolymer having a molecular weight of at least 10,000 and a glass transition temperature from 20° to 250° C.

2. A composition as claimed in claim 1 in which X represents —CH$_2$—CH$_2$—CH$_2$ and said vinyl lactam polymer is a homopolymer.

3. A composition as claimed in claim 2 in which said first copolymer is a copolymer of ethyl acrylate with a copolymerizable ethylenic monomer containing a carboxylic group.

4. A composition as claimed in claim 3 in which the ethylenic monomer is acrylic acid.

5. A composition as claimed in claim 2 in which said first copolymer is a copolymer of butyl acrylate with a copolymerizable ethylenic monomer containing a carboxylic group.

6. A composition as claimed in claim 5 in which the ethylenic monomer is acrylic acid.

7. A composition as claimed in claim 2 in which said first copolymer has a molecular weight of at least 750,000 and the amount of said polymer in the blend is from 5 to 15% by weight of the blend.

8. A composition as claimed in claim 1 in which X represents —CH$_2$—CH$_2$—CH$_2$ and said vinyl lactam polymer is a copolymer.

9. A composition as claimed in claim 8 in which said first copolymer is a copolymer of ethyl acrylate with a copolymerizable ethylenic monomer containing a carboxylic group and said vinyl lactam copolymer is a copolymer of 1-vinyl-2-pyrrolidone with a member of the group consisting of vinyl acetate and alkyl acrylates and methacrylates in which the alkyl group has from 1 to 14 carbon atoms.

10. A composition as claimed in claim 9 in which said ethylenic monomer containing a carboxylic group is acrylic acid.

11. A composition as claimed in claim 8 in which said first copolymer is a copolymer of butyl acrylate with a copolymerizable ethylenic monomer containing a carboxylic group and said vinyl lactam copolymer is a copolymer of 1-vinyl-2-pyrrolidone with a member of the group consisting of vinyl acetate and alkyl acrylates and methacrylates in which the alkyl group has from 1 to 14 carbon atoms.

12. A composition as claimed in claim 11 in which said ethylenic monomer containing a carboxylic group is acrylic acid.

* * * * *